United States Patent
Varekamp et al.

(10) Patent No.: US 11,050,991 B2
(45) Date of Patent: Jun. 29, 2021

(54) IMAGE PROCESSING USING A PLURALITY OF IMAGES FOR A THREE DIMENSION SCENE, HAVING A DIFFERENT VIEWING POSITIONS AND/OR DIRECTIONS

(71) Applicant: KONINKLIJKE PHILIPS N.V., Eindhoven (NL)

(72) Inventors: Christiaan Varekamp, Veldhoven (NL); Patrick Luc Els Vandewalle, Oud-Turnhout (BE)

(73) Assignee: Koninklijke Philips N.V., Eindhoven (NL)

( * ) Notice: Subject to any disclaimer, the term of this patent is extended or adjusted under 35 U.S.C. 154(b) by 27 days.

(21) Appl. No.: 16/334,042
(22) PCT Filed: Sep. 28, 2017
(86) PCT No.: PCT/EP2017/074632
§ 371 (c)(1),
(2) Date: Mar. 18, 2019
(87) PCT Pub. No.: WO2018/060334
PCT Pub. Date: Apr. 5, 2018

(65) Prior Publication Data
US 2019/0273902 A1  Sep. 5, 2019

(30) Foreign Application Priority Data
Sep. 29, 2016 (EP) .................................. 16191405

(51) Int. Cl.
*H04N 13/117* (2018.01)
*H04N 13/128* (2018.01)
(Continued)

(52) U.S. Cl.
CPC ......... *H04N 13/117* (2018.05); *G06T 3/4038* (2013.01); *H04N 13/122* (2018.05);
(Continued)

(58) Field of Classification Search
CPC .. H04N 13/117; H04N 13/189; H04N 13/128; H04N 13/167; H04N 13/156;
(Continued)

(56) References Cited

U.S. PATENT DOCUMENTS 6,195,122 B1  2/2001  Vincent
6,292,215 B1  9/2001  Vincent
(Continued)

FOREIGN PATENT DOCUMENTS

WO  2011085812 A1  7/2011
WO  2015184416 A1  3/2015

OTHER PUBLICATIONS

Marek Domanski et al "New Results in Free-Viewpoint Television Systems for Norizontal Virtual Navigation" 2016 IEEE International Conf. on Multimedia and Expo, IEEE Jul. 11, 2016, p. 1-6.
(Continued)

*Primary Examiner* — Daniel F Hajnik

(57) ABSTRACT

An apparatus comprises a store (201) storing images corresponding to different positions and viewing directions for a scene, and associated position parameter vectors for the images where the vector for an image comprises data indicative of a viewing position and a viewing direction. A receiver (205) receives a viewing position parameter vector from a remote client (101). A selector (207) selects a set of images in response to a comparison of the viewing position parameter vector and the associated position parameter vectors. An image synthesizer (209) generates an image from the set of images. A data generator (215) generates a reference position parameter vector for the synthesized image indicating a viewing position and direction for the synthesized image. An image encoder (211) encodes the synthesized image and an output generator (213) generates an output image signal comprising the encoded synthesized image and the reference position parameter vector. The output image signal is transmitted to the remote client.

20 Claims, 5 Drawing Sheets

(51) Int. Cl.
*H04N 13/156* (2018.01)
*H04N 13/122* (2018.01)
*G06T 3/40* (2006.01)
*H04N 13/194* (2018.01)
*H04N 21/6587* (2011.01)
*H04N 21/2187* (2011.01)
*H04N 13/282* (2018.01)
*H04N 21/2343* (2011.01)
*H04N 21/4402* (2011.01)
*H04N 21/4728* (2011.01)
*H04N 13/161* (2018.01)
*H04N 21/218* (2011.01)
*H04N 13/167* (2018.01)
*H04N 13/189* (2018.01)
*H04N 19/597* (2014.01)

(52) U.S. Cl.
CPC ......... *H04N 13/128* (2018.05); *H04N 13/156* (2018.05); *H04N 13/161* (2018.05); *H04N 13/167* (2018.05); *H04N 13/189* (2018.05); *H04N 13/194* (2018.05); *H04N 13/282* (2018.05); *H04N 21/2187* (2013.01); *H04N 21/21805* (2013.01); *H04N 21/2343* (2013.01); *H04N 21/4402* (2013.01); *H04N 21/4728* (2013.01); *H04N 21/6587* (2013.01); *H04N 19/597* (2014.11)

(58) Field of Classification Search
CPC .. H04N 13/194; H04N 13/122; H04N 13/161; H04N 13/282; H04N 21/21805; H04N 21/2187; H04N 21/2343; H04N 21/4402; H04N 21/4728; H04N 21/6587; H04N 19/597; G06T 3/4038; G06T 19/006; G06T 15/205
See application file for complete search history.

(56) References Cited

U.S. PATENT DOCUMENTS

| | | | |
|---|---|---|---|
| 6,337,683 B1 | 1/2002 | Gilbert et al. | |
| 6,654,019 B2 | 11/2003 | Gilbert et al. | |
| 7,050,102 B1 | 5/2006 | Vincent | |
| 7,274,380 B2 | 9/2007 | Navab et al. | |
| RE42,289 E | 4/2011 | Vincent | |
| 2005/0174346 A1* | 8/2005 | Park | G06T 15/205 345/422 |
| 2007/0253025 A1 | 11/2007 | Terayoko | |
| 2009/0262180 A1* | 10/2009 | Kim | H04N 5/23238 348/36 |
| 2011/0001792 A1* | 1/2011 | Pandit | H04N 19/597 348/43 |
| 2013/0113701 A1* | 5/2013 | Sasaki | G06T 19/00 345/156 |
| 2013/0223537 A1 | 8/2013 | Kasai et al. | |
| 2015/0117547 A1* | 4/2015 | Zhao | H04N 21/4345 375/240.25 |
| 2017/0142480 A1* | 5/2017 | Gupta | H04N 21/458 |
| 2017/0328726 A1* | 11/2017 | Matsuzawa | G09B 29/10 |
| 2018/0302603 A1* | 10/2018 | Tanaka | H04N 13/111 |

OTHER PUBLICATIONS

Ärpädhuszäk :"Advanced free viewpoint video streaming techniques",Multimedia Tools and Applications, Klüwer Academic Publishers, Boston, US, vol. 76, No. 1, Nov. 11, 2015 (Nov. 11, 2015), pp. 373-396.
"Technical report of the joint ad hoc group for digital representations of light/sound fields for immersive media applications",115. MPEG Meeting;May 30, 2016-Mar. 3, 2016;Geneva; (Motion Picture Expert Group or ISO/IEC JTC1/SC29/WG11),,No. N16352,Jun. 13, 2016.
Toni Laura et al: "In-Network View Synthesis for Interactive Multiview Video Systems", IEEE Transactions on Multimedia, IEEE Service Center, Piscataway, NJ, US, vol. 18, No. 5, May 1, 2016 (May 1, 2016), pp. 852-864.
https://en.wikipedia.org/wiki/Range_tree (downloaded Feb. 19, 2019).

* cited by examiner

IMAGE PROCESSING USING A PLURALITY OF IMAGES FOR A THREE DIMENSION SCENE, HAVING A DIFFERENT VIEWING POSITIONS AND/OR DIRECTIONS

CROSS-REFERENCE TO PRIOR APPLICATIONS

This application is the U.S. National Phase application under 35 U.S.C. § 371 of International Application No. PCT/EP2017/074632, filed on Sep. 28, 2017, which claims the benefit of EP Patent Application No. EP 16191405.6, filed on Sep. 29, 2016. These applications are hereby incorporated by reference herein.

FIELD OF THE INVENTION

The invention relates to image processing and in particular, but not exclusively, to a system for providing three dimensional images in a virtual reality system.

BACKGROUND OF THE INVENTION

The variety and range of image and video applications have increased substantially in recent years with new services and ways of utilizing and consuming video being continuously developed and introduced.

For example, one service being increasingly popular is the provision of video in such a way that the viewer is able to actively and dynamically interact with the system to change parameters of the rendering. A very appealing feature in many applications is the ability to change the effective viewing position and viewing direction of the viewer, such as for example allowing the viewer to move and "look around" in the scene being presented.

Such a feature can specifically allow a virtual reality experience to be provided to a user. This may allow the user to (relatively) freely move about in a scene and dynamically change where he is looking. Typically, such virtual reality applications are based on a three-dimensional model of the scene with the model being dynamically evaluated to provide the specific requested view. This approach is well known from e.g. game applications, such as in the category of first person shooters, for computers and consoles.

However, such applications are inherently limited in that they are based on a predetermined model of the scene. It would be desirable for many applications if a virtual reality effect with the user being able to select viewing positions and direction could be implemented for real-life captured video. An attempt at such a feature has been implemented by using multiple cameras with different viewing positions and directions with the video being selected from the camera considered to be closest to the viewers current position. However, such an approach tends to require a relatively high number of parallel video streams to be distributed and also provides a suboptimal experience with the user clearly noticing when the view switches from one camera to another.

It is also desirable for in particular virtual reality applications that the image being presented is a three-dimensional image. Indeed, in order to optimize immersion of the viewer, it is typically preferred for the user to experience the presented scene as a three-dimensional scene. Indeed, a virtual reality experience should preferably allow a user to select his/her own position, camera viewpoint, and moment in time relative to a virtual world. In an 'ideal' virtual world, the dynamic scene is continuously being captured by camera sensors from all positions in all directions.

As an example, virtual reality glasses are currently entering the market. These glasses allow viewers to experience captured 360 degree (panoramic) video. These 360 degree videos are often pre-captured using camera rigs where individual images are stitched together into a single spherical mapping. Common stereo formats for 360 video are top/bottom and left/right. Similar to non-panoramic stereo video, the left-eye and right-eye pictures are compressed as part of a single H.264 video stream. After decoding a single frame, the viewer rotates his/her head to view the world around him/her. A current example, is a recording made by Google of a concert in Carnegie Hall [https://performingarts.withgoogle.tabhumblecom/en_us/performances/camegie-hall]. In this example, viewers can experience a 360 degree look-around effect, and can discretely switch between three video streams recorded from different positions. When switching, another video stream is loaded, which interrupts the experience.

One drawback of the stereo panoramic video approach is that the viewer cannot change position in the virtual world. Encoding and transmission of a panoramic depth map besides the panoramic stereo video could allow for compensation of small translational motions of the viewer at the client side but such compensations would inherently be limited to small variations and movements and would not be able to provide an immersive and free virtual reality experience.

A related technology is free-viewpoint video in which multiple view-points with depth maps are encoded and transmitted in a single video stream. The bitrate of the video stream could be reduced by exploiting angular dependencies between the view-points in addition to the well-known temporal prediction schemes. However, the approach still requires a high bit rate and is restrictive in terms of the images that can be generated. It cannot practically provide an experience of completely free movement in a three-dimensional virtual reality world.

However, none of the prior-art technologies can deliver an ideal experience but tends to be restrictive in the freedom of the changes in the positions and viewing directions. In addition, the technologies tend to require a very high data rate and provide data streams that include more data than is necessary for the generation of the individual images/views.

Hence, an improved image processing approach would be advantageous. In particular, an approach that allows improved operation, increased flexibility, increased scope for generating images corresponding to different viewing positions and directions, an improved virtual reality experience, reduced data rates, facilitated distribution, reduced complexity, facilitated implementation and/or improved performance and/or operation would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus comprising: a store for storing a plurality of images for a three-dimensional scene, the images corresponding to different positions and viewing directions for the scene and the store further being arranged to store associated position parameter vectors for the plurality of images, an associated position parameter vector for an image of the plurality of images comprising data indicative of a viewing position and a viewing direction for the image; a receiver for receiving a viewing position parameter vector from a remote client; a selector for selecting a set of images of the plurality of images in response to a comparison of the viewing position parameter vector and the associated position parameter vectors; an image synthesizer for generating a synthesized image from the set of images; a data generator arranged to generate a reference position parameter vector for the synthesized image, the reference position parameter vector being indicative of a viewing position and a view direction for the synthesized image; an image encoder for encoding the synthesized image to generate an encoded synthesized image; an output generator for generating an output image signal comprising the encoded synthesized image and the reference position parameter vector; and a transmitter for transmitting the output image signal to the remote client.

The invention may provide an improved approach for supporting customized user experiences e.g. based on real-life image captures. The approach may specifically provide improved support of e.g. virtual reality experiences that are based on capturing of events/scenes. The approach may allow generation of customized experiences wherein a remote client can vary and control the movement of a viewer in an environment represented by the images stored in the store.

In particular, the approach may in many embodiments effectively support a setup wherein a remote client can provide a virtual reality experience based on images that are received from the apparatus operating as a server. The images provided by the server can effectively be customized to the current conditions and requirements of the virtual reality application at the server thereby minimizing the amount of post-processing required by the remote client. However, the server may still provide information that allows the server to refine the received image to adjust for any deviation of the current viewer position/direction from that represented by the communicated image.

In many embodiments, an improved experience and a more freely controllable experience can be provided. Further, this may be provided without requiring excessive bandwidth and indeed in most embodiments an adaptive and flexible virtual reality experience can be achieved based on captured video while only requiring a bandwidth from the server to the client corresponding to the bandwidth of a single video stream.

In many embodiments, the plurality of images may be captured images for the scene, and specifically it may be images captured by cameras in a real-life scene. The plurality of images stored in the store may be images capturing a real-life scene. In many embodiments, the plurality of images may include images taken at different time instants and they may accordingly reflect dynamic changes in the scene. The plurality of images may specifically include frames of captured video of a real-life scene.

A position parameter vector may be a data structure or arrangement comprising one or more values indicative of one or more parameters, where at least one parameter is indicative of a viewing position and at least one parameter is indicative of a viewing direction. For captured images, the viewing position and direction may correspond to the camera position and orientation/direction when capturing the image. The data representing a position parameter vector may be arranged in any suitable way, and may e.g. include values that are provided commonly for a plurality of the images.

The receiver may be arranged to receive the viewing position parameter vector from a remote client via a communication medium that may include a network, and specifically it may include the Internet. The viewing position parameter vector may be indicative of a desired viewing position and viewing direction for the synthesized image being generated by the apparatus/server. The viewing position parameter vector may in many embodiments be generated to represent a position and viewing direction of a user in a virtual scene represented by the images stored in the store.

The selection of the set of images may specifically be in response to a proximity criterion for the viewing position parameter vector and the associated position parameter vectors. Specifically, a distance measure between the viewing position parameter vector and individual associated viewing position parameter vectors may be determined and the selection may be in response to this distance measure. Typically, the set of images may be selected to include the images for which the distance measure meets a criterion (such as e.g. that it is below a threshold or is one of the N lowest difference measures).

Synthesizing the image may comprise a synthesis based on a plurality of images of the set of images. Specifically, in many embodiments, the synthesis comprises performing view synthesis based on a plurality of images of the set of images. In some embodiments, the synthesis may comprise selecting a single image from the set of images (such as the closest one). In many embodiments, the synthesizing is in response to the viewing position parameter vector and the associated position parameter vectors of the set of images. Specifically, the viewing position parameter vector may be considered to represent a desired viewing position and direction.

In some embodiments, the synthesized image may be generated by view transformation of the image of one or more images of the set of images, where the view transformation corresponds to transforming the viewing point and direction from that of the one or more images to the desired viewing position and direction. In some embodiments, the viewing position and direction of the synthesized image may however be modified from the desired viewing position and direction as represented by the viewing position parameter vector by taking into account the viewing position and direction of the images. E.g. if a stored image has a position parameter vector very close to the position parameter vector, the viewing position and direction for the synthesized image may be set to that of the stored image.

The data generator may be arranged to generate the reference position parameter vector for the synthesized image in response to associated position parameter vectors of images of the first set of images, and sometimes in response to the viewing position parameter vector. For example, the generated reference viewing position parameter vector may be generated as the viewing direction and position for which the synthesized image has been generated.

The apparatus may in many embodiments support a plurality of remote clients simultaneously. Specifically, it may from each of a plurality of remote clients receive viewing position parameter vectors, and it may in response generate synthesized images for each individual remote client/viewing position parameter vector and transmit these back to the appropriate client.

The viewing positions and viewing directions may be provided with reference to the scene represented by the images. They may be provided as positions and directions in the virtual world/scene represented by these images.

In accordance with an optional feature of the invention, at least one of the associated position parameter vectors and the viewing position parameter vector include a time parameter, and the selection of the set of images includes a comparison of a difference between a time parameter value of the viewing position parameter vector and time parameter values of the at least one of the associated position parameter vectors.

This may provide improved operation and/or improved user experiences/services in many embodiments. It may in particular provide improved support for dynamically changing scenes. For example, it may support providing a virtual reality experience of a live and dynamic event, such as a concert or sports event.

The synthesized image may simple be a generated image, and references to the synthesized image may be replaced by references to the generated image.

In accordance with an optional feature of the invention, the selector is arranged to predict a modified viewing position parameter vector from a plurality of received viewing position parameter vectors, and the selector is arranged to select the set of images in response to the modified viewing position parameter vector; or the image synthesizer is arranged to generate the synthesized image in response to the modified viewing position parameter vector.

This may provide improved operation in many embodiments and scenarios. It may in particular result in the apparatus generating a synthesized image which is likely to be closer to that needed by the remote client when this receives the image. The plurality of received viewing position parameter vectors may include the currently/most recently received viewing position parameter vector.

In accordance with an optional feature of the invention, the apparatus further comprises a cache and a pre-selector arranged to predict a modified viewing position parameter vector from a plurality of received viewing position parameter vectors, and to pre-select a predicted set of images from the plurality of images in response to a comparison of the modified viewing position parameter vector and the associated position parameter vectors and to store the predicted set of images in the cache; and the selector is arranged to retrieve at least one image of the set of images from the predicted set of images stored in the cache.

This may provide improved operation in many embodiments and scenarios. It may allow faster generation of the synthesized image and thus reduce the delay in responding. The approach may reduce the overall latency and therefore result in the apparatus providing an image to the server which is likely to need less post-processing by the remote client. The plurality of received viewing position parameter vectors may include the currently/most recently received viewing position parameter vector.

In accordance with an optional feature of the invention, the store further comprises depth data for the images and the image synthesizer is arranged to further generate depth data for the synthesized image in response to depth data for the set of images, and the generator is arranged to include the depth data in the output image signal.

This may facilitate and/or improve post-processing in the remote client of the received image to make this more closely correspond to the current conditions. In particular, it may improve view point transformations. The depth data may in many embodiments be in the form of a depth map or a three-dimensional mesh.

In accordance with an optional feature of the invention, the apparatus is arranged to receive a series of viewing position parameter vectors and to generate the output image signal to comprise a sequence of synthesized images corresponding to the series of viewing position parameter vectors.

The approach may support continuous operation where the remote client continuously transmits viewing position parameter vectors and the apparatus in response continuously generates synthesized images which are transmitted back to the remote client. In many embodiments, the apparatus may generate a series of images which indeed form a video stream that can be processed and rendered by the remote client.

In many embodiments, the apparatus may be arranged to generate a plurality of synthesized images for each viewing position parameter vector being received. For example, the same image may be repeatedly transmitted until a new viewing position parameter vector is received. This may e.g. be suitable for very slow moving applications in a static world. In other embodiments, new synthesis images may be generated at a rate corresponding to a desired frame rate. These images may each be based on the same viewing position parameter vector but on different images, and specifically on images at different time instants. This may e.g. provide a video stream which reflects dynamic events happening in the scene but where these are viewed from the same viewing position and in the same direction (e.g. a spectator at a sports event sitting still and looking in the same direction).

In some embodiments, the apparatus may be arranged to interpolate between different received viewing position parameter vectors, or may be able to predict viewing position parameter vectors, for times between viewing position parameter vectors being received. In this case, these interpolated/predicted viewing position parameter vectors can be used between the time instants at which viewing position parameter vectors are received.

In accordance with an optional feature of the invention, the receiver is arranged to apply a low pass filter to at least one parameter of the series of viewing position parameter vectors.

This may in many embodiments provide or allow an improved user experience. Specifically, it may allow a smoother update and change of the experienced views to be achieved. It may further facilitate image/video encoding and may typically reduce the required data rate for a given quality. The filter may typically be a temporal low pass filter.

In accordance with an optional feature of the invention, the receiver is further arranged to receive a selection instruction, and the selector is arranged to adapt a selection criterion for selecting the set of images in response to the selection instruction.

This may in particular allow increased customization and adaption to the individual preferences and requirements of the individual user/application. It may specifically provide an efficient way of supporting, controlling and/or switching between different virtual reality modes/services.

In accordance with an optional feature of the invention, the selector is arranged to ignore a parameter of the viewing position parameter vector in the comparison in response to receiving a selection instruction requesting that the parameter is to be ignored.

This may provide a particularly efficient customization and adaption to the individual preferences and requirements of the individual user/application. The parameter may typically be a time parameter.

In accordance with an optional feature of the invention, the store is arranged to store the associated position parameter vectors in a range tree structure, and the selector is arranged to select the subset in response to a search in the range tree structure.

This may provide a particularly efficient approach and may in particular allow efficient search and selection of suitable images meeting requirements suitable for e.g. the virtual reality experience. It may in many scenarios enable the real-time provision of a controllable video stream based on a large number of stored video streams, In accordance with an aspect of the invention, there is provided an image processing apparatus comprising: a position processor for determining a first viewing position parameter vector comprising parameters indicative of a viewing position and viewing direction; a transmitter for transmitting the viewing position parameter vector to a remote image server; a receiver for receiving a signal from the remote image server, the signal comprising a first image and a reference position parameter vector indicative of a viewer direction and a viewer position for the first image; an update processor arranged to determine an updated viewing position parameter vector reflecting changes in viewer position and view direction with respect to the first viewing position parameter vector; and an image synthesizer arranged to generate a synthesized image from the first image in response to the reference position parameter vector and the updated viewing position parameter vector.

The invention may provide an improved approach for supporting customized user experiences e.g. based on real-life image captures. The approach may specifically provide improved support of e.g. virtual reality experiences that are based on capturing of events/scenes. The approach may allow generation of customized experiences wherein a remote client can vary and control the movement of a viewer in an environment represented by the images stored in the store.

The approach allows the image processing apparatus to operate as a remote client for an image/video server which provides images of a scene. The image processing apparatus can control the viewing position and direction in the scene based on the transmitted viewing position parameter vector. Presenting the image(s) received from the remote server to a user can e.g. be used to provide a virtual reality experience. The user can move in this virtual reality scene with the image processing apparatus controlling the remote server to provide appropriate images that follow this movement.

Further, by the image processing apparatus dynamically updating the viewing position parameter vector and performing local post-processing to generate/synthesize an image which reflects differences from the originally transmitted viewing position parameter vector, and improved experience can be provided. Specifically, the approach can compensate for latency and result in virtual reality experience without any perceptible lag.

In accordance with an optional feature of the invention, the image synthesizer is arranged to apply a view transformation to the first image corresponding to a viewing difference between the updated viewing position parameter vector and the reference position parameter vector.

This may provide an improved user experience with an image being presented which more closely reflects the current conditions.

The generation of the synthesized image from the first image in response to the reference position parameter vector and the updated viewing position parameter vector may specifically include performing view transformation that reflects differences in the viewing position and/or viewing direction between the updated position parameter vector and the viewing position parameter vector. Such view transformation may e.g. be based on depth data which is received together with the image, i.e. which is also received from the remote server.

According to an aspect of the invention there is provided an image processing system comprising an image server comprising the apparatus as described above and an image client comprising the image processing apparatus as described above.

According to an aspect of the invention there is provided a method for providing an image, the method comprising: storing a plurality of images for a three-dimensional scene, the images corresponding to different positions and viewing directions for the scene; storing associated position parameter vectors for the plurality of images, an associated position parameter vector for an image of the plurality of images comprising data indicative of a viewing position and a viewing direction for the image; receiving a viewing position parameter vector from a remote client; selecting a set of images of the plurality of images in response to a comparison of the viewing position parameter vector and the associated position parameter vectors; generating a synthesized image from the set of images; generating a reference position parameter vector for the synthesized image, the reference position parameter vector being indicative of a viewing position and a view direction for the synthesized image; encoding the synthesized image to generate an encoded synthesized image; generating an output image signal comprising the encoded synthesized image and the reference position parameter vector; and transmitting the output image signal to the remote client.

According to an aspect of the invention there is provided a method comprising: determining a first viewing position parameter vector comprising parameters indicative of a viewing position and viewing direction; transmitting the viewing position parameter vector to a remote image server; receiving a signal from the remote image server, the signal comprising a first image and a reference position parameter vector indicative of a viewer direction and a viewer position for the first image; determining an updated viewing position parameter vector reflecting changes in viewer position and view direction with respect to the first viewing position parameter vector; and synthesizing a synthesized image from the first image in response to the reference position parameter vector and the updated viewing position parameter vector.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to an image processing and distribution system supporting a three-dimensional virtual reality application. However, it will be appreciated that the invention is not limited to this application but may be applied to many other image processing algorithms and systems.

Figure 1:
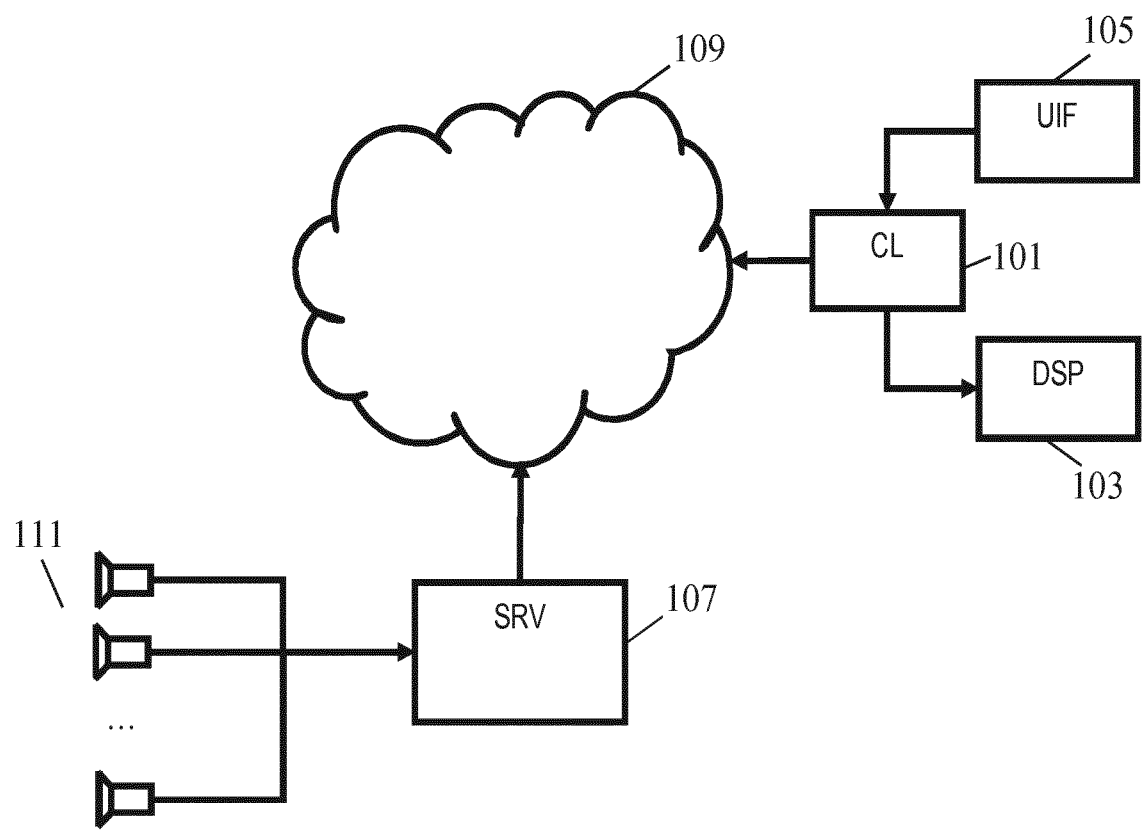
FIG. 1 illustrates an example of elements of an image processing and distribution system in accordance with some embodiments of the invention.

FIG. 1 illustrates an image/video distribution system based on a client/server approach. The system will be described with reference to an example where a client device 101 provides a three dimensional (3D) virtual reality experience to a user. In the example, the client device 101 is coupled to a display 103 which specifically may be comprised in a virtual reality headset. The display 103 may present images generated by the client device 101 in order to provide the virtual reality experience to the user. Specifically, stereo images providing a 3D depth experience may be projected to the eyes of the user.

The client device 101 is further coupled to a user interface 105 through which the user can control the virtual movement of the user in the virtual world. The user interface 105 may typically provide means for controlling both the user movement and changes in viewing direction. The user interface 105 may use active inputs requiring the user to directly control motion (e.g. a joystick) or may e.g. include more passive inputs that automatically detect a user's movements. For example, the user interface 105 may include detectors, such as accelerometers, detecting a user's head movements. As a specific example, both the user interface 105 and the display 103 may be (at least partially) implemented by a virtual reality headset.

A virtual reality experience should preferably allow the user to select the position, viewpoint/direction, and movement in time relative to a virtual world. However, whereas this can be implemented in artificial virtual reality experiences based on graphic models (such as in computer games), this is very difficult to effectively and accurately achieve for experiences based on real life captured images or video. Indeed, in an 'ideal' virtual world, the dynamic scene would be continuously captured by camera sensors from all positions in all directions. However, obviously such an approach is not feasible.

This illustrates a fundamental difference between a virtual world experience based on capturing of real life features (typically by cameras) and the pure computer graphics case where 3D models and textures are produced offline and a virtual world is generated using known computer graphics techniques. For live-video for instance, such an approach is not feasible. Indeed, although it could perhaps be imagined that a single geometric model could be developed from live video, it would not practically be feasible to automatically generate such a world with high accuracy and detail. Thus, the approach would not be feasible for most applications, and in particular not for real time applications.

In the system of FIG. 1, the 3D virtual reality experience is provided to the user on the basis of images/video received from a remote image server 107. The client device 101 and the remote image server 107 are coupled together via a communication channel which in the specific example is implemented by a network 109. The network 109 may specifically be, or comprise, the Internet.

In the system, the remote image server 107 provides images to the client device 101 on which basis the client device 101 generates the image presented to the user. The remote image server 107 is coupled to a potentially large number of image capture devices, which in the specific example are video cameras 111. The cameras 111 capture a real-life scene in typically many different directions and from many different viewing positions. These images/video streams are stored in the remote image server 107 and are used to provide images to the client device 101 such that this can generate images corresponding to the captured scene while allowing the user to dynamically control the movement and viewing directions within this scene. The scene may in some embodiments be a static scene but may also in many embodiments be a dynamic scene which varies as a function of time (such as e.g. a recording of a sports event).

In order to provide a practically useable system, it is critical to reduce the data rate between the remote image server 107 and the client device 101. It is therefore not feasible to simply transmit the captured image streams/videos. Further, simply allowing the user to switch between the captured videos results in a substantially reduced experience and will generally not allow a realistic virtual reality experience. Apart from the capturing problem, the amount of image data that would need to be streamed to the user would additionally grow with the added freedom of the viewer taking an arbitrary position in 3D space in addition to selecting a view-direction.

In the system of FIG. 1, the remote image server 107 stores the images/video from the cameras 111 in a local memory. The client device 101 is arranged to transmit a viewing position parameter vector to the remote image server 107 with the viewing position parameter vector being indicative of the (desired) viewing position and direction in the scene. Based on the received viewing position parameter vector, the remote image server 107 is arranged to retrieve appropriate images from the memory and to generate/synthesize an image that is relevant to the received viewing position parameter vector. The generated image, referred to as the synthesized image, is specifically generated to be one that corresponds to the view from the position and in the direction which is indicated in the received viewing position parameter vector.

The synthesized image is transmitted back to the client device 101 where it may be processed (specifically a relatively minor view shift may be used to adjust for differences between the earlier transmitted viewing position parameter vector and the current viewing position/direction) before being presented to the user.

Specifically, in the system, based on stored video streams, a customized video is by the remote image server 107 encoded and transmitted to a user depending on the individual user's location and view-direction in the virtual world. Two users that access one and the same virtual reality database will accordingly receive different encoded video streams (e.g. in H.264) depending on their current location and viewing directions in the virtual 3D space.

The video stream for the individual user is thus customized to the individual user and may specifically be close to the view that corresponds to the current viewing position and direction. However, due to the latency, the position and viewing direction may have changed since the viewing position parameter vector was transmitted and accordingly the client device 101 may modify the received image to account for this deviation.

Thus, in the system, only one image need to be transmitted from the remote image server 107 to the client device 101, and therefore the data rate can be kept low. However, the system still allows an accurate image to be presented to the user with the image closely corresponding to the user's current position and viewing direction. The approach achieves this by using a customized approach where the synthesis of the image for the user is distributed across the remote image server 107 and the client device 101 with the remote image server 107 generating a suitable image that will typically be close to that corresponding to the current position and viewing direction, and with the client device 101 fine tuning this image to account for any deviations.

As a specific example, the remote image server 107 may generate personal H.264 video streams for the individual users via multi-dimensional queries on a pre-stored image database. The query typically uses a viewing position parameter vector comprising six parameters that reflect the users current situation in the virtual world (three for the position, two for the viewing direction, and one temporal parameter). During the video encoding process, the remote image server 107 may receive actual measurements of user position and viewing direction from the client device 101. Depending on these parameters, a set of images is retrieved from the memory/data base. The actual view of the user is synthesized from these images using image based rendering and the result is added to a H.264 encoding stream. A personal video is thus created in real-time in response to the changing location and viewing direction parameters of the user.

A practical example application can be the recording of a pop concert. For example, 100 people may be capturing a video of the event. A 'traditional' storage approach would be to store these 100 video streams at the server side. If a customer then wants to navigate his own way through the crowd, this would result in a series of requests to the server, switching each time from one video stream to another (and starting another decoding process).

In contrast, in accordance with the exemplary approach described herein, all the 100 captured video streams could be stored as individual images in a single database, with each image e.g. being indexed with a position, orientation and time. The proposed workflow for visualization may then be as follows:

1. The client device 101 sends location/orientation/time to the remote image server 107;
2. A search is performed to determine relevant images;
3. The remote image server 107 synthesizes a view image from the relevant images;
4. The remote image server 107 adds the synthesized view image to the current output video stream;
5. The client device 101 receives video with meta-data (position and view direction as well as optionally a time parameter) from the remote image server 107;
6. The client device 101 synthesizes current view(s) depending on the current (device) viewing position, direction and time.

Figure 2:
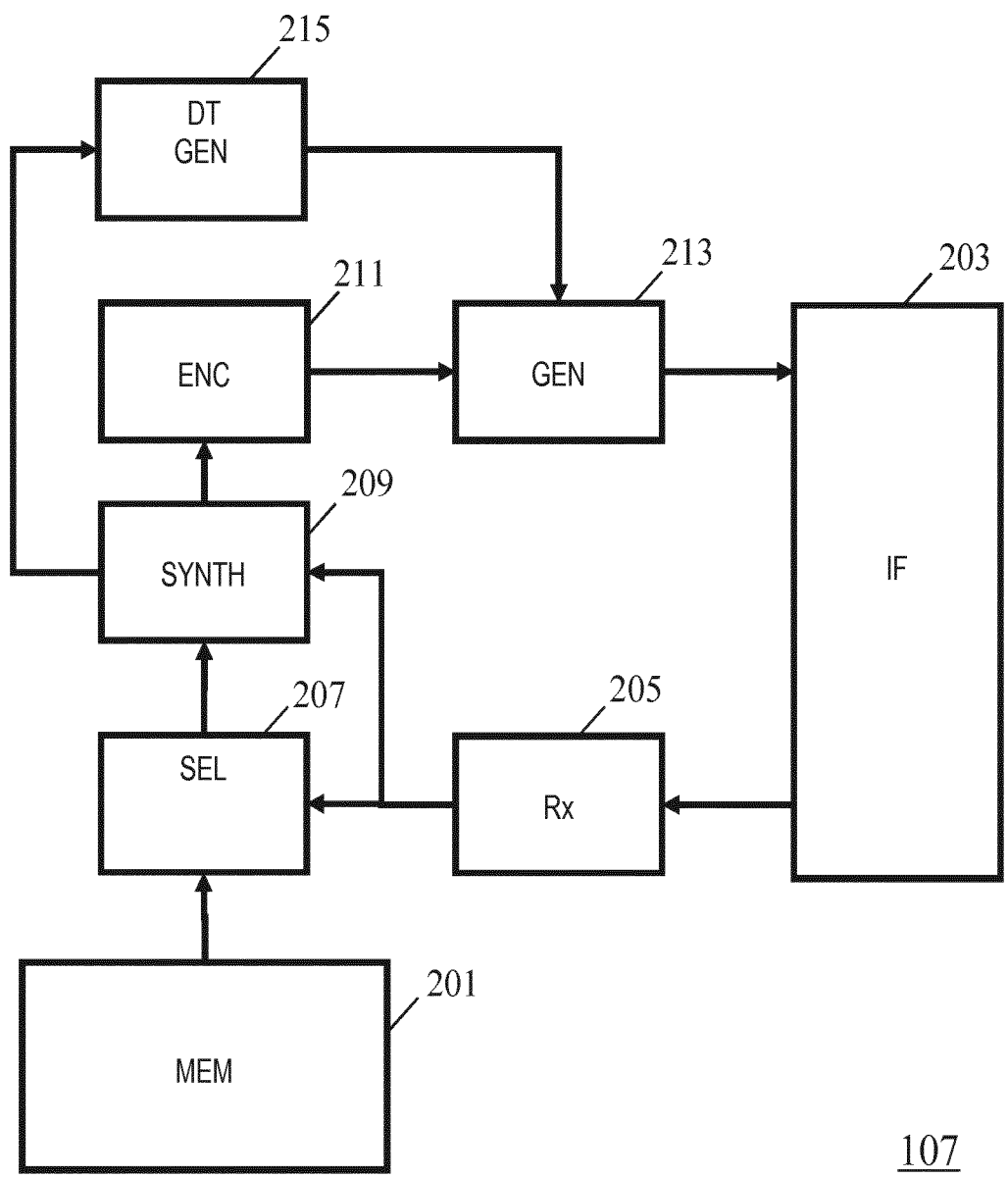
FIG. 2 illustrates an example of elements of an image server for the system of FIG. 1.

FIG. 2 illustrates some elements of the remote image server 107 of FIG. 1 in more detail.

The remote image server 107 comprises a store/memory 201 in which the captured images/video streams from the cameras 111 are recorded. In addition to the images/video streams, metadata will be stored indicating the position, camera direction (viewing direction), and possibly the time for the individual images. The metadata may be stored as common meta-data, e.g. for a fixed camera the position and possibly camera direction may simply be provided for the stream as such. However, in many embodiments, meta-data reflecting time varying camera positions and/or directions may be stored, and different images may accordingly have different associated meta-data.

In the following, the terms images/video will be used interchangeably when referring to the signals provided in the system but it will be appreciated that video streams inherently are made up of individual images (frames) and that the approach does not necessarily require sequences of images but can be applied to single images.

The meta-data stored with the images in the memory 201 may thus provide a data vector which includes a plurality of parameters. These parameters for the individual image provide values that are indicative of (at least) a viewing position and a viewing direction for the image. For example, a vector may include three parameters that indicate a viewing position, such as specifically an x, y, and z coordinate in the virtual world. In addition, the vector may include two parameters that indicate a viewing direction, such as an azimuth and an elevation value. Correspondingly, the position parameter vector may be a data set or structure which includes parameter values that define a position and (viewing direction). In the example, three position parameters/coordinates and two direction parameters are included but it will be appreciated that in other embodiments other numbers may be used. It will also be appreciated that the data vector may be represented, stored or processed in any suitable way and does not need to be e.g. five or six values stored together in e.g. consecutive memory locations. Rather, the vector may be any representation providing parameters for an image including an indication of (at least) a viewing position and viewing direction.

For example, if a camera follows a predetermined path through the virtual world, this path may be expressed as a function of a single variable and the vector may possibly be represented by only a single parameter value representing this variable. The specific position and viewing direction of the camera may in this case be calculated as a predetermined function of the variable. It will be appreciated that in such embodiments, a position parameter vector could be considered to correspond to the values resulting from evaluating the function (e.g. the coordinates of the calculated positions or viewing direction) or to the input variable(s) itself.

It will also be appreciated that in many embodiments, parameter values of a position parameter vector may be implicit or common for a plurality of images. For example, a group of cameras may be positioned in line with e.g. the same x-coordinate. In such a case, the corresponding position parameter vectors may be stored/represented by a single value indicating the x-coordinate for the group followed by the individual parameter values for the varying position/viewing direction parameters.

In many embodiments, such as the specific exemplary application of a concert or sports event, the temporal aspect is important. Specifically, for a static virtual world experience, the time parameter may typically be disregarded and the same image will be generated for the same viewing position and direction regardless of the time. An example of such an application may be an empty museum which has been photographed or filmed from many different positions and in many different directions. For all images, an associated position parameter vector may be stored which reflects the position and camera direction for that individual image. However, as the scene is static and does not change with time, there is no need or purpose in also recording the time of the capture. Accordingly, a five parameter data vector may be stored for the images.

The client device 101 may in such examples provide a viewing position parameter vector to the remote image server 107 which also comprises five parameter values. In response to this, the remote image server 107 may generate a suitable image without considering any temporal aspects. The approach may for example allow the client device 101 to generate a virtual reality experience where the user can freely walk around in a three-dimensional virtual museum to look at the various exhibits.

In most applications, such as e.g. a rendering of a concert or a sports event, the captured scene however changes in time. In such cases, the stored images are typically also associated with a temporal parameter, i.e. the associated position parameter vector also includes a time parameter. This allows a virtual experience to be provided that reflects a dynamic real time event. The following description will focus on the application of the approach to provide a virtual reality experience of a temporal event (rather than just a static virtual reality world), such as for example a concert or a sports event.

The cameras may capture a dynamic scene by a series of images (specifically a video stream) from many different positions and in many different directions. The remote image server 107 may store the dynamic virtual world in the memory 201 as separate pictures together with associated position parameter vectors.

Specifically, the images may be stored in a structure corresponding to a range tree (https://en.wikipedia.org/wiki/Range_tree). Indeed, the Inventors have realized that for the specific application, the use of a range tree structure provides particularly advantageous approaches as it may substantially facilitate the identification and selection of suitable images for a given received viewing position parameter vector.

In the specific example, the associated position parameter vector represents six different parameters and accordingly single point in the range tree can be represented by the six-dimensional parameter vector:

$$v=(x,y,z,\theta,\varphi,t),$$

where x, y, z represent the camera position in Euclidian coordinates, $\theta$ is the camera polar angle, $\varphi$ is the camera azimuth angle, and t represents time.

The remote image server 107 further comprises a network interface 203 which is arranged to interface the remote image server 107 to the network 109 such that it can communicate with other devices. Specifically, the network interface 203 is arranged to receive data from and transmit data to the client device 101. It will be appreciated that the skilled person will be well aware of many approaches for communication between two devices, including communication via a network, such as the Internet. For brevity these will accordingly not be described in detail but it will be appreciated that any suitable approach for the remote image server 107 and client device 101 communicating with each other may be used.

The remote image server 107 comprises a receiver 205 which specifically can receive a viewing position parameter vector from the client device 101. The viewing position parameter vector may comprise a number of parameters and provides an indication of a position of a viewer and of the direction in which the viewer is looking in the virtual world. The viewer position parameter vector provides an indication of the viewing position and direction for which the client device 101 requests an image (of the virtual world/scene) to be provided. Thus, the viewing position parameter vector may typically indicate a specific viewer position and direction for the user moving in the three-dimensional virtual world generated at the client device 101.

Typically, the viewing position parameter vector comprises a set of parameters that may further include a time parameter as previously discussed. For example, for a sports event application, the viewing position parameter vector may include three parameter values that indicate the position of the viewer, two parameter values that indicate the viewing direction, and one parameter value which represents the time instant for which the image is desired.

Thus, corresponding to the associated position parameter vectors stored for the images in the memory 201, the viewing position parameter vector may specifically be represented by the six-dimensional parameter vector:

$$v_c=(x,y,z,\theta,\varphi,t),$$

where x, y, z represent the position of the viewer in Euclidian coordinates, $\theta$ is the polar angle and $\varphi$ is the azimuth angle for the direction in which the viewer is looking, and t represents time.

The remote image server 107 may then proceed to synthesize an image corresponding to the viewing position parameter vector, i.e. it may proceed to generate an image that corresponds to the view from the position of x,y,z when looking in the direction of $\theta$, $\varphi$ at time t.

In order to do so, the remote image server 107 first selects a suitable set of stored images from the memory 201 after which it synthesizes an image corresponding to the viewing position parameter vector based on the selected set of images.

The receiver 205 is accordingly connected to a selector 207 which is arranged to select a set of images of the images stored in the memory in response to a comparison of the viewing position parameter vector and the associated position parameter vectors. The selection will typically comprise selecting the images that meet a given proximity requirement. For example, a distance measure between the values of the parameters of the position parameter vectors may be defined and evaluated for all the stored images. The set of images may then e.g. be selected as the images that have a distance measure below a given threshold, or e.g. as the N images that have the lowest distance measure.

In principle, the search through all stored images could be a very complex and resource consuming operation in many systems. However, in the described example, the images are stored in a range tree structure, and specifically the range tree structure is organized around the parameters of the position parameter vector. The range tree may be an N-dimensional tree where N is the dimension of the vector, i.e. it reflects the number of parameters.

In the specific example, given the received viewing position parameter vector (reflecting the actual location/rotation and time provided by the client), a recursive binary search is conducted in the range tree to find all images that satisfy e.g.:

$$v_{c,k}-\Delta_k<v_k\leq v_{c,k}+\Delta_k$$

for all k where k is an index representing the individual parameter of the vector, and $v_c$ is the viewing position parameter vector. The acceptable deviation value $\Delta_k$ for the individual parameter k may be different for different parameters, and may in some embodiments be controllable by the client device 101 as will be described later.

The comparison may typically (unless e.g. a static world virtual reality experience is provided) include a consideration of a time parameter. Specifically, in the equation above, one value of k may correspond to the time parameter. The acceptable deviation $\Delta_k$ will often be set relatively low for the temporal parameter in order to ensure a time consistent generation of images (specifically to ensure that a time consistent video is generated).

This specific search based on a range tree may be highly efficient and indeed the complexity may be determined as $$O((\log n)^d+k),$$

where n is the number of data (images), d is the dimensionality of the search space, and k is the number of images in the requested interval.

Depending on the acceptable deviations $\Delta_k$, the range search can result in zero to N retrieved images. If zero images are found, corresponding to the set of images being empty, this indicates that the user is moving outside the space that is represented by the virtual world as supported by the remote image server 107/the captured images. In this case, the remote image server 107 may e.g. return an error message and/or provide an image corresponding to the closest captured image.

The remote image server 107 also includes an image synthesizer 209 which is arranged to generate/synthesize an image corresponding to the viewing position parameter vector from the selected and retrieved set of images. This synthesis may specifically include a view synthesis operation which may e.g. perform view shifting, interpolation etc. using the images of the set of images. In some embodiments, the synthesis may further include selecting a subset of the set of images and only using this for the synthesis. In many situations, the synthesis is based on a plurality of images and may specifically involve view interpolation between at least two images of the set of images.

As an example of processes of synthesis, the image synthesizer 209 may perform disparity estimation between pairs of images that are close in parameter space and infer a depth map. Based on the depth map a new image can be synthesized.

The image synthesizer 209 is coupled to an image encoder 211 which is arranged to encode the synthesized image in a suitable format. For example, the remote image server 107 may generate an H.264 encoded video stream that is sent to the client device 101, and the image encoder 211 may be arranged to encode the synthesized image in accordance with the H.264 encoding format. It will be appreciated that any suitable video or image encoding format may be used.

The image encoder 211 is coupled to an output generator 213 which is arranged to generate an output signal in the form of a data stream comprising the encoded synthesized image. The output generator 213 is coupled to the network interface 203 which is arranged to transmit the output data stream to the client device 101.

Thus, in response to transmitting a viewing position parameter vector indicating a viewing position, direction and typically time, the client device 101 will from the remote image server 107 receive an image that corresponds to these parameters. Accordingly, the user of the client device 101 can define a position and view direction (and time) in the virtual world, and in return will receive an image that seeks to provide the view of the virtual world that the user will perceive from this position and in this direction (and at this time).

The remote image server 107 further comprises a data generator 215 which is arranged to generate a reference position parameter vector for the synthesized image where the reference position parameter vector is indicative of a viewing position and viewing direction, and typically a time instant, for the synthesized image.

The reference position parameter vector may be the same format as the associated position parameter vectors and/or the viewing position parameter vector. It provides corresponding information for the synthesized image and may also often be provided in the form of a vector:

$$v=(x,y,z,\theta,\varphi,t),$$

where x,y, z are the viewing position in Euclidian coordinates, $\theta$ is the viewing direction polar angle, $\varphi$ is the viewing direction azimuth angle and t represents time. Indeed, the comments provided with respect to the viewing position parameter vector (and the associated position parameter vectors) are also relevant, mutatis mutandis, to the reference position parameter vector.

The reference position parameter vector thus provides a reference point for the synthesized image and specifically indicates the position and viewing directions (and time) for which the image is generated. These may differ from the received values, i.e. the reference position parameter vector may differ from the viewing position parameter vector. This may for example occur due to the granularity of the captured images. For example, by generating the synthesized image for a slightly different position or time than that of the viewing position parameter vector, it may be possible to more directly use one or more of the stored images and this may provide a higher image quality.

As another example, the server can have a prediction model in place that can predict where the user is going to look at and how the user is moving in time. Making a prediction means that the server will send back a different parameter vector than what was requested by the clients.

Thus, typically, whereas the reference position parameter vector may deviate from the viewing position parameter vector, the deviation will typically be relatively small and indeed the client device 101 will typically receive a synthesized image which is very close to that of the parameters for which it was requested.

The data generator 215 is coupled to the output generator 213 which is arranged to include the reference position parameter vector in the generated data stream that is sent to the client device 101.

Figure 3:
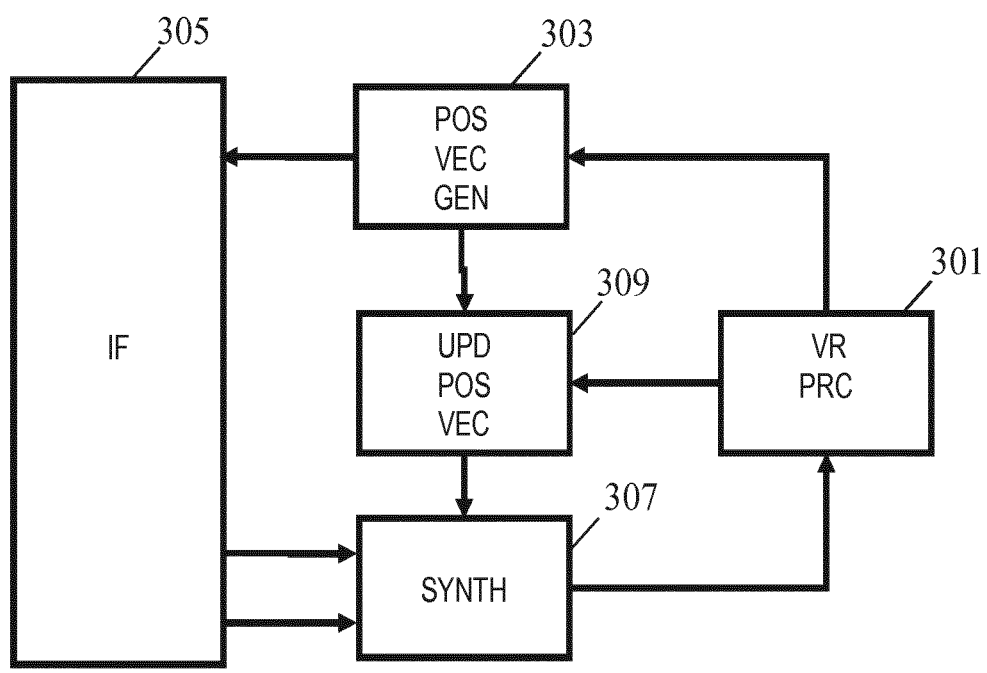
FIG. 3 illustrates an example of elements of an image client for the system of FIG. 1.

FIG. 3 illustrates some elements of the client device 101 of FIG. 1 in more detail.

The client device 101 comprises a virtual reality processor 301 which is arranged to execute a virtual reality application providing a virtual reality experience to a user based on the images received from the remote image server 107. The virtual reality processor 301 may specifically interface with a virtual reality headset and/or e.g. a joystick in order to track a user's movement and head movement in a virtual world. The virtual reality processor 301 may provide 3D images to the virtual reality headset and track how the user moves his head based on input from the virtual reality headset.

The virtual reality processor 301 is coupled to a position processor 303 which is arranged to determine a current viewing position parameter vector comprising parameters indicative of a viewing position and viewing direction in the virtual world. The position processor 303 may specifically receive the information of the position and the viewing direction from the virtual reality processor 301 and may package this data in a suitable data structure. It may further add a time parameter, such as the current time instant (e.g. in real time or in the time frame of the virtual reality). In some embodiments, the position processor 303 may also receive the time information from the virtual reality processor 301.

The position processor 303 is coupled to a network interface 305 which is arranged to interface the client device 101 to the network 109 such that it can communicate with other devices, and specifically with the remote image server 107. It will be appreciated that other communication means may be used in other embodiments.

The client device 101 is thus arranged to generate a viewing position parameter vector and transmit it to the remote image server 107 using the network interface 203 as a transmitter. In response, the remote image server 107 synthesizes a corresponding image and transmits it to the client device 101 together with a reference position parameter vector as previously described.

The network interface 305 supports bi-directional communication and thus also functions as a receiver which receives this signal/data stream comprising the image and the reference position parameter vector. The network interface 305 is coupled to a client image synthesizer 307 which is arranged to synthesize an output image based on the received image. This synthesized output image is fed to the virtual reality processor 301 which may then present it to the user.

However, due to the latency of the system, the current position of the user in the virtual world may have changed since the viewing position parameter vector was transmitted to the remote image server 107. Accordingly, the client device 101 comprises an update processor 309 which is arranged to determine an updated viewing position parameter vector that reflects changes in the viewing position and viewing direction with respect to the transmitted viewing position parameter vector.

In some embodiments, the updated viewing position parameter vector may be generated as a relative vector that e.g. indicates the differences between the current values and the transmitted viewing position parameter vector values. However, in other embodiments, the updated viewing position parameter vector may simply be a current viewing position parameter vector. Thus, in some embodiments, the update processor 309 may simply request a current viewing position parameter vector from the position processor 303. Indeed, the position processor 303 may continuously generate and transmit viewing position parameter vectors to the remote image server 107, and may also provide these to the update processor 309. The viewing position parameter vector currently being sent may accordingly also be an updated viewing position parameter vector for a previously sent viewing position parameter vector (and thus for a currently received image/reference position parameter vector).

The updated viewing position parameter vector is fed to the client image synthesizer 307 which proceeds to synthesize the output image based on the received image, the reference position parameter vector, and the updated viewing position parameter vector.

The changes in the user's position and viewing direction, as well as any deviation introduced by the processing at the remote image server 107, is typically relatively small. Accordingly, the differences between the updated viewing position parameter vector and the reference position parameter vector are typically relatively small. Typically, the differences are indicative of relatively small changes in the position of the user and/or the direction in which he is looking.

Accordingly, the client image synthesizer 307 can perform relatively small corrections to the received image when synthesizing the output image. Specifically, the client image synthesizer 307 may perform view rotations or translations by appropriately translating the positions of the pixels in the stereo images. For instance, an image with associated 3D mesh may be received by the client. The current view can then be synthesized using texture mapping. Alternatively, an image with associated depth map may be received by the client. The client can then create a mesh based on the per pixel depth followed again by texture mapping to synthesize the new view. In another example, the client may generate a new view from the image with associated depth map using a depth image based rendering method.

Thus, the client image synthesizer 307 may specifically be arranged to perform a viewing point/direction transformation to the received image prior to the rendering where the viewing point/direction transformation is dependent on the differences between the received reference position parameter vector and the generated updated viewing position parameter vector.

Figure 4:
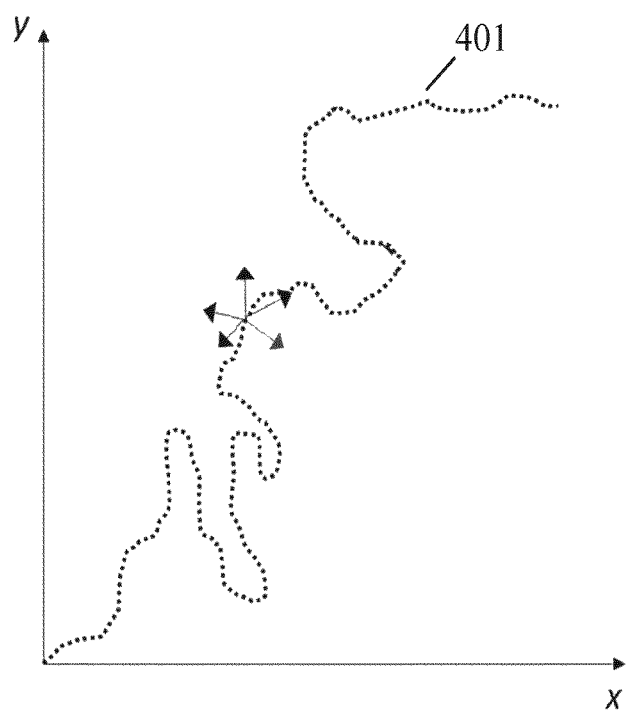
FIGS. 4 and 5 illustrate examples of viewing positions and directions relative to camera positions and directions.
Figure 5:
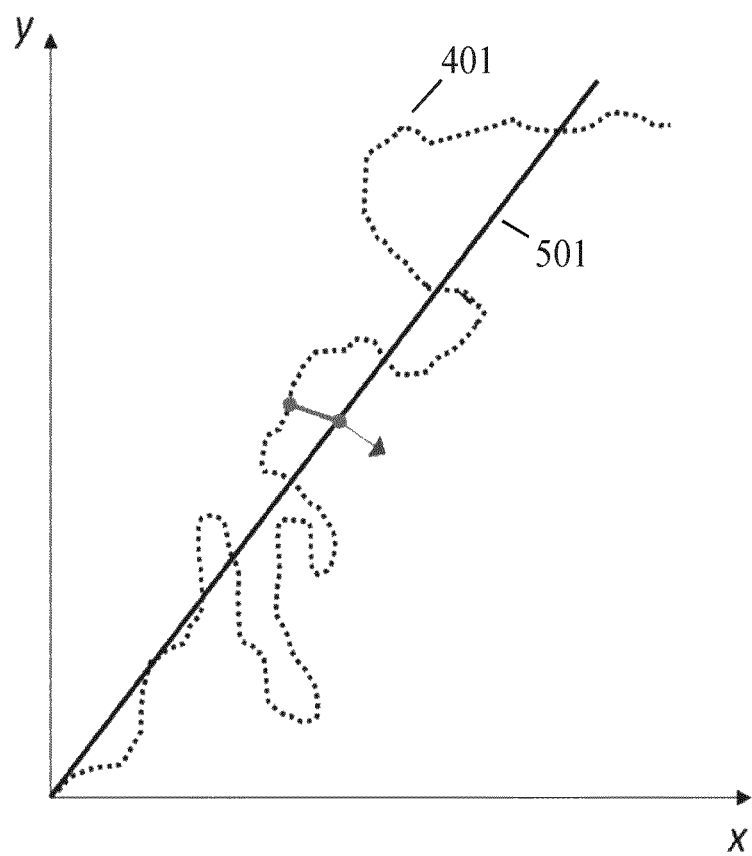

The benefit of applying a view transformation at the client side may be illustrated by FIGS. 4 and 5. FIG. 4 illustrates a trajectory 401 that may have been followed by a camera when capturing the scene with multi-directional images being captured at each position along this trajectory (with a suitable granularity/step size). FIG. 5 illustrates an example of a trajectory 501 that may be taken by a user in the virtual environment. At each viewing position, the nearest available captured image may be added to the video stream (e.g. the selector 207 may select the closest image. The client device 101 may decode the image for this nearest point. However, as indicated, the positions may not be identical but rather there may be a small difference. As the remote image server 107 also provides a reference position parameter vector, the client image synthesizer 307 can compare this to the updated viewing position parameter vector and perform a view transformation that accordingly compensates for this. This transformation thus compensates for the viewing difference between the updated viewing position parameter vector and the reference position parameter vector. This may compensate for latency issues and possible inaccuracies in the received parameter measurements.

In many dynamic embodiments, the process may also consider a time parameter. This may e.g. be used to interpolate between a series of received images and/or may e.g. be used to match the received images/reference position parameter vector and the locally generated updated viewing position parameter vector.

Thus, the system provides for an approach wherein a user can dynamically and fluidly be provided with a three dimensional experience based on real life captured images. The approach may provide a high degree of flexibility and fluidity of motion in the virtual world. Indeed, in many applications the user may be provided with an experience that seems unrestricted in movement, continuous, and typically with high image quality (for immersive experiences. The image quality may in some applications be less that what e.g. consumers may be used to for e.g. high quality TV broadcasts).

The approach is based on distributing the image generation across a server and a client device 101 with the server providing a typically rough but almost correct image which can be refined at the client device 101. This may be used to address issues such as latency or artefacts caused by the processing in the remote image server 107 or the granularity inherently arising from a limited number of capture points or devices.

Further, the data rate and bandwidth required for the service is kept low with only a single image/video stream being necessary for the individual client device 101. Thus, multiple parallel streams are not required.

In many embodiments, the image synthesis of the image synthesizer 209 and/or the client image synthesizer 307 may be based on performing a 3D view transformation based on depth data. The depth data may for example be in the form of a 3D mesh for the image or may e.g. be a depth map comprising e.g. depth or disparity values for the pixels of the image.

Accordingly, in many embodiments, the memory 201 may in addition to the images also store depth information, such as a depth map. The depth map may e.g. be generated directly by the cameras 111 being 3D cameras.

When extracting the set of images, the selector 207 may also extract the depth data (specifically depth maps) for these images. The images and associated depth maps may then be used by the image synthesizer 209 to make adjustments. In addition to generating a synthesized image, the image synthesizer 209 may also generate depth information, such as a depth map or a mesh for the synthesized image. This depth map/mesh may also be fed to the output generator 213 and may be included in the output file.

In some embodiments, the image synthesizer 209 may simply synthesize the image by a selection of the closest image. In such cases, the output depth map/mesh may simply correspond to the stored depth map/mesh for that image.

Thus, in some embodiments, the client device 101 may in addition to an image corresponding to the viewing position parameter vector also receive depth data for this image. This may typically be in a form of a depth map or mesh and may be used directly by the client image synthesizer 307 to perform view transformations. For example, the displacement for individual pixels when e.g. the viewer is translating depends on depth. Specifically, objects that are close to the viewer will be shifted more than objects that are further away from the viewer.

A particular advantage of the described approach is that it is particularly suitable to a dynamic user experience. Indeed, a dynamic process of the client device 101 continuously providing viewing position parameter vectors and the remote image server 107 in response providing a continuous stream of images, and specifically a video stream, may be supported. Further, this is effectively achieved using only a forward bandwidth corresponding to essentially a single video stream and a reverse bandwidth corresponding to a low rate data connection.

Thus, in many embodiments, the remote image server 107 may receive a series of viewing position parameter vectors, e.g. with an update rate of 5-100 Hz. In response, the remote image server 107 may generate synthesized images and return them to the client device 101, e.g. as a video stream with a suitable frame rate (or possibly with a higher or lower frame rate than required with the client device 101 being able to perform frame rate adaptation (e.g. using interpolation) based on the included time parameters). Thus, the remote image server 107 may generate the output image signal to comprise a sequence of synthesized images corresponding to the series of viewing position data vectors.

Indeed, in many embodiments the approach may allow a dynamic real time virtual reality experience to be provided with both high image quality and bandwidth requirements.

The approach may also allow the remote image server 107 to support a plurality of users simultaneously. Specifically, the remote image server 107 can receive viewing position parameter vectors from a plurality of client devices and can in response generate a customized and personalized video stream for each client device/user.

In some embodiments, the selector 209 may be arranged to predict a modified viewing position parameter vector from a plurality of received viewing position parameter vectors (including the current one). For example, the selector 209 may include a multi-dimensional prediction filter, such as a Kalman filter. This may predict a trajectory of the user in the three-dimensional virtual space, and may e.g. additionally or alternatively predict the viewing direction. As a simple example, the trajectory of the user in the example of FIG. 5 can easily be predicted by even a first order linear prediction filter.

Thus, based on a series of received viewing position parameter vectors, future viewing position parameter vectors (or at least some parameters thereof) may be predicted by the remote image server 107. Thus, in some embodiments, the selector 209 may comprise a predictor which predicts a modified viewing position parameter vector that may correspond to an estimate of the viewing position and/or viewing direction for a future time.

Such prediction may be used in different ways.

For example, in some embodiments, the selector 107 may be arranged to select the set of images in response to the modified viewing position parameter vector and/or the client image synthesizer 307 may be arranged to synthesize the synthesized image in response to the modified viewing position parameter vector.

Specifically, the approaches described previously may be used but instead of directly using the received viewing position parameter vector, the modified viewing position parameter vector may be used. This may result in the generation of an image which corresponds to a typically slightly modified position/viewing direction. Specifically, the remote image server 107 may estimate a latency (e.g. by pinging the client device 101 or applying a timing estimation process based on timing information being included in messages between the remote image server 107 and the client device 101). The predictor may then be used to estimate the viewing position parameter vector that it would expect to receive at a time that is offset by this latency. Thus, the remote image server 107 can in this way seek to predict the user position/viewing direction at the time that the image is received or rendered by the client device 101. It may then provide a synthesized image corresponding to this position/viewing direction. In many embodiments, this is likely to result in an image which is closer to the desired view and thus may reduce the amount of post-processing/view transformation required by the client device 101.

Alternatively or additionally, the prediction may be used to perform a pre-selection. For example, the remote image server 107 may include a cache in which images can be stored after being retrieved from the memory 201. The cache may for example correspond to GPU memory or dedicated memory for the client image synthesizer 307. The images in this cache may accordingly be retrieved faster than from the memory 201 (which will typically be optimized for capacity rather than speed).

In some embodiments, the selector 209 may comprise a pre-selector which based on a predicted modified viewing position parameter vector selects a set of images that are extracted from the memory 201 and stored in the cache. The modified viewing position parameter vector may specifically be a prediction of the next viewing position parameter vector and when this is received, the selected images may be retrieved from the cache rather than the memory 201 if indeed they have been pre-selected.

As an example, the pre-selection may be based on exactly the same principle as the selection but e.g. allowing a larger deviation. For example, the pre-selection may also be based on finding all images that satisfy e.g.:

$$v_{c,k} - \Delta_k < v_k \le v_{c,k} \Delta_k$$

However, the value $\Delta_k$ may be selected substantially higher for the pre-selection than for the subsequent selection in order to compensate for the uncertainty in the prediction.

Such a pre-fetching of reference views on the basis of predictions that are made about where the user is going may reduce the time delay in generating a synthesized image and may accordingly reduce the overall latency.

In some embodiments, the receiver may be arranged to apply a low pass filter to at least one parameter of the series of viewing position parameter vectors. For example, the received x, y and z coordinates of a series of consecutive viewing position parameter vectors may be individually filtered in order to provide a smooth position trajectory. Thus, effectively the individual parameters may be temporally low pass filtered to reflect a smoother operation. Thus, the approach allows for a particularly efficient smoothing of the user experience without e.g. requiring temporal interpolation between subsequent received images/frames by the client device 101. The approach may in particular allow a higher consistency and smooth variations over subsequent images of the sequence. This may facilitate the video encoding.

Indeed, for an efficient encoding of the video stream, it is preferable that the video temporally follows a smooth motion. To ensure this, the user position and viewing direction parameters may be filtered by the remote image server 107 to produce a video that changes smoothly over time. This reduces bit-rate for the same quality. The introduced differences with respect to the actual position and orientation may be compensated for by the client-side view-synthesis (using the transmitted mesh or depth map), i.e. the approach of the client image synthesizer 307 performing view transformation allows the filtering to introduce deviations with respect to the received viewing position parameter vectors without this unreasonably degrading the perceived quality. Since there may be an unknown roundtrip delay, the remote image server 107 may as previously mentioned send a reference position parameter vector with each video frame. The client device 101 can use this information for a correct view-synthesis. To avoid temporal inconsistencies between the newly received data and the currently synthesized data, alpha blending can be used to provide a smooth motion experience.

In some embodiments, the client device 101 may further be arranged to send control data affecting the operation of the remote image server 107. This may for example be used to control the characteristics of the images generated by the remote image server 107 and may in particular be used to e.g. select between different modes of operation and between different virtual reality experiences. Specifically, it may control restrictions imposed on the generation of the synthesized images.

In some embodiments, the client device 101 may specifically be arranged to transmit selection instructions which control how the selector 209 selects the set of images. Thus, the client device 101 may transmit a selection instruction to the remote image server 107 and in response to receiving this, the remote image server 107 may adapt the selection criterion used by the selector 209.

The selection instruction may specifically include an indication of how the different parameters should be prioritized or e.g. how large a deviation is to be accepted for different parameters. For example, the selection instruction may indicate that relatively large variations in, say, the x direction are acceptable whereas variations in the y directions must be kept low.

In particular, the selection instruction may indicate that a specific parameter (or set of parameters) should be ignored when selecting the images. In particular, the selection instruction may indicate that the time parameter should be ignored and that all images sufficiently close to the indicated position and viewing direction should be included regardless of when they were taken. As another example, the selection instruction may indicate that an asymmetric criterion should be included and that only images captured after the current time instant (in the virtual world) should be included.

The inclusion of such selection instructions may for example allow the client device 101 to operate in different modes controlled e.g. by a user.

For example, depending on the type of content, a user may want to explore the captured environment in different ways. In the setup described above, this can be handled using different settings for interval parameter $\Delta_k$ which can be controlled by a selection instruction being transmitted from the client device 101 to the remote image server 107.

Exemplary operating modes may for example include:
1. Chrono mode: The chronological order in which events happen is of importance. Playback can be paused, but frames should never go back in time. Only small variations in the time parameter $\Delta_t$ will be allowed. Examples: a concert (where the audio is the most critical part), a sports event.
2. Static world mode: The recording is explored as a static 3D model, so the time at which frames were captured has become irrelevant. The six parameter space is now reduced to a five parameter space. This will result in a denser space to retrieve data from, and therefore in denser valid positions/viewing angles for the viewer. Examples: a virtual museum visit, architecture.
3. Trajectory mode: The recording is explored as a static 3D world. Such a trajectory or path in 3D space (x,y,z) can then be explored in different directions taking different routes. Examples: a hiking trail.

For some applications, the dimensionality of the search space can be further reduced:
1. In the static world mode described above, the time dimension is absent, resulting in a 5D space.
2. In the trajectory mode described above, the time dimension is absent, and the (x,y,z) position can be reduced to a single parameter s along the trajectory. This results in a 3D space.
3. For sports events, the time dimension is critical, but viewing position and direction can typically be restricted (viewers are typically watching the field, and not so much the stadium itself).

For instance, the user can decide that he wants to experience the virtual world for a rather large time interval $\Delta_t$. In that case the user will receive a video that only depends on location and orientation for a short instance of time and nothing is moving in the scene other than induced by the user's own motion.

In some embodiments, the client image synthesizer 307 may further be able to crop the received image when generating the synthesized image. Thus, in some embodiments, the viewing angle represented by the synthesized image which is presented to the user may be smaller than that of the received image. The cropping may be dependent on the updated viewing position parameter vector and the reference position parameter vector.

Thus, in some embodiments, the remote image server 107 may generate an image that has a larger field-of-view than is actually required by the display used to render the image to the user. This may facilitate the operation of the client image synthesizer 307 as it may allow the selection of received image which is used to generate the synthesized image to be selected to best correspond to the updated viewing position parameter vector. As a low complexity example, if a user has turned his head to the left since the viewing position parameter vector was transmitted, the client image synthesizer 307 may select an image section more towards the left hand side of the received image and use this for the synthesis. If instead the user has turned his head to the right, an image section more towards the right hand side of the image may be used.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. An apparatus, comprising:
a memory,
wherein the memory is arranged to store a plurality of images for a three-dimensional scene,
wherein the plurality of images correspond to different positions and viewing directions for the three-dimensional scene,
wherein the memory is arranged to store associated position parameter vectors for the plurality of images,
wherein an associated position parameter vector for an image of the plurality of images comprises data which is indicative of a viewing position and a viewing direction for the image;
a receiver circuit, wherein the receiver circuit is arranged to receive a viewing position parameter vector from a remote client wherein the viewing position parameter vector indicates a desired viewing position and desired viewing direction for the three-dimensional scene;
a selector circuit, wherein the selector circuit is arranged to select a set of images from the plurality of images in response to a comparison of the viewing position parameter vector and the associated position parameter vectors;
an image synthesizer circuit, wherein the image synthesizer circuit is arranged to generate a synthesized image from the set of images;
a data generator circuit, wherein the data generator circuit is arranged to generate a reference position parameter vector for the synthesized image, wherein the reference position parameter vector is indicative of a viewing position and a viewing direction for the synthesized image;
an image encoder circuit, wherein the encoder circuit is arranged to encode the synthesized image to generate an encoded synthesized image;
an output generator circuit, wherein the output generator circuit is arranged to generate an output image signal comprising the encoded synthesized image and the reference position parameter vector for the synthesized image;
a transmitter circuit, wherein the transmitter circuit is arranged to transmit to the remote client the output image signal including the encoded synthesized image and the reference position parameter vector for the synthesized image;
a cache; and
a pre-selector circuit,
wherein the pre-selector circuit is arranged to predict a modified viewing position parameter vector from a plurality of received viewing position parameter vectors,
wherein the pre-selector circuit is arranged to pre-select a predicted set of images from the plurality of images in response to a comparison of the modified viewing position parameter vector and the associated position parameter vectors,
wherein the pre-selector circuit is arranged to store the predicted set of images in the cache, and
wherein the selector circuit is arranged to retrieve at least one image of the set of images from the predicted set of images stored in the cache.

2. The apparatus of claim 1,
wherein at least one of the associated position parameter vectors includes a first time parameter,
wherein the viewing position parameter vector includes a second time parameter,
wherein the selection of the set of images includes a comparison of a difference between the first time parameter and the second time parameter.

3. The apparatus of claim 1,
wherein the selector circuit is arranged to predict a modified viewing position parameter vector from a plurality of received viewing position parameter vectors, and
wherein the selector circuit is arranged to select the set of images in response to the modified viewing position parameter vector.

4. The apparatus of claim 1,
wherein the memory is arranged to store a first depth data for the plurality of images,
wherein the image synthesizer circuit is arranged to generate a second depth data for the synthesized image in response to the first depth data of the set of images, and
wherein the output generator circuit is arranged to include the second depth data in the output image signal.

5. The apparatus of claim 1,
wherein the apparatus is arranged to receive a series of viewing position parameter vectors, and
wherein the apparatus is arranged to generate the output image signal to comprise a sequence of synthesized images corresponding to the series of viewing position parameter vectors.

6. The apparatus of claim 5, wherein the receiver circuit is arranged to apply a low pass filter to at least one parameter of the series of viewing position parameter vectors.

7. The apparatus of claim 1,
wherein the receiver circuit is arranged to receive a selection instruction, and
wherein the selector circuit is arranged to adapt a selection criterion for selecting the set of images in response to the selection instruction.

8. The apparatus of claim 7, wherein the selector circuit is arranged to ignore a parameter of the viewing position parameter vector in the comparison in response to the received selection instruction requesting that the parameter is to be ignored.

9. The apparatus of claim 1,
wherein the memory is arranged to store the associated position parameter vectors in a range tree structure, and
wherein the selector circuit is arranged to select the subset in response to a search in the range tree structure.

10. The apparatus of claim 1,
wherein the selector circuit is arranged to predict a modified viewing position parameter vector from a plurality of received viewing position parameter vectors, and
wherein the image synthesizer circuit is arranged to synthesize the synthesized image in response to the modified viewing position parameter vector.

11. A method for providing an image, the method comprising:
storing a plurality of images for a three-dimensional scene, wherein the images correspond to different positions and viewing directions for the three-dimensional scene;
storing associated position parameter vectors for the plurality of images, wherein at least one of the associated position parameter vectors comprises data indicative of a viewing position and a viewing direction for the image;
receiving a viewing position parameter vector from a remote client;
selecting a set of images from the plurality of images in response to a comparison of the viewing position parameter vector and the associated position parameter vectors;
generating a synthesized image from the set of images;
generating a reference position parameter vector for the synthesized image, wherein the reference position parameter vector is indicative of a viewing position and a view direction for the synthesized image;
encoding the synthesized image to generate an encoded synthesized image;
generating an output image signal, wherein the output image signal comprises the encoded synthesized image and the reference position parameter vector for the synthesized image;
transmitting to the remote client the output image signal including the encoded synthesized image and the reference position parameter vector for the synthesized image;
predicting a modified viewing position parameter vector from a plurality of received viewing position parameter vectors;
pre-selecting a predicted set of images from the plurality of images in response to a comparison of the modified viewing position parameter vector and the associated position parameter vectors;
storing the predicted set of images in a cache; and
retrieving at least one image of the set of images from the predicted set of images stored in the cache.

12. The method of claim 11,
wherein at least one of the associated position parameter vectors includes a first time parameter,
wherein the viewing position parameter vector includes a second time parameter, and
wherein the selecting of the set of images includes a comparison of a difference between the first time parameter and the second time parameter.

13. The method of claim 11,
wherein the selecting is arranged to predict a modified viewing position parameter vector from a plurality of received viewing position parameter vectors, and
wherein the selecting is arranged to select the set of images in response to the modified viewing position parameter vector.

14. The method of claim 11,
wherein the selecting is arranged to predict a modified viewing position parameter vector from a plurality of received viewing position parameter vectors, and
wherein the synthesized image is produced in response to the modified viewing position parameter vector.

15. The method of claim 11,
wherein the storing comprises storing a first depth data for the plurality of images, and
wherein the generation of the synthesized image generates second depth data for the synthesized image in response to the first depth data for the set of images.

16. An apparatus, comprising:
a processor circuit;
a memory,
wherein the memory is arranged to store a plurality of images for a three-dimensional scene, wherein the images correspond to different positions and viewing directions for the three-dimensional scene, wherein the memory is arranged to store associated position parameter vectors for the plurality of images, and wherein an associated position parameter vector for an image of the plurality of images is indicative of a viewing position and a viewing direction for the image;

a receiver firmware executed on the processor circuit, wherein the receiver firmware is arranged to receive a viewing position parameter vector from a remote client;

a selector firmware executed on the processor circuit, wherein the selector firmware is arranged to select a set of images of the plurality of images in response to a comparison of the viewing position parameter vector and the associated position parameter vectors;

an image synthesizer firmware executed on the processor circuit, wherein the image synthesizer firmware is arranged to generate a synthesized image from the set of images;

a data generator firmware executed on the processor circuit, wherein the generator firmware is arranged to generate a reference position parameter vector for the synthesized image, wherein the reference position parameter vector is indicative of a viewing position and a view direction for the synthesized image;

an image encoder firmware executed on the processor circuit, wherein the encoder firmware is arranged to encode the synthesized image to generate an encoded synthesized image;

an output generator firmware executed on the processor circuit, wherein the output generator firmware is arranged to generate an output image signal comprising the encoded synthesized image and the reference position parameter vector for the synthesized image;

a transmitter firmware executed on the processor circuit, wherein the transmitter firmware is arranged to transmit to the remote client the output image signal comprising the encoded synthesized image and the reference position parameter vector for the synthesized image;

a cache; and a pre-selector firmware executed on the processor circuit,
wherein the pre-selector firmware is arranged to predict a modified viewing position parameter vector from a plurality of received viewing position parameter vectors,
wherein the pre-selector firmware is arranged to preselect a predicted set of images from the plurality of images in response to a comparison of the modified viewing position parameter vector and the associated position parameter vectors,
wherein the pre-selector firmware is arranged to store the predicted set of images in the cache, and
wherein the selector firmware is arranged to retrieve at least one image of the set of images from the predicted set of images stored in the cache.

17. An apparatus, comprising:
a memory,
wherein the memory is arranged to store a plurality of images for a three-dimensional scene,
wherein the plurality of images correspond to different positions and viewing directions for the three-dimensional scene,
wherein the memory is arranged to store associated position parameter vectors for the plurality of images,
wherein an associated position parameter vector for an image of the plurality of images comprises data which is indicative of a viewing position and a viewing direction for the image;

a receiver circuit, wherein the receiver circuit is arranged to receive a viewing position parameter vector from a remote client wherein the viewing position parameter vector indicates a desired viewing position and desired viewing direction for the three-dimensional scene;

a selector circuit, wherein the selector circuit is arranged to select a set of images from the plurality of images in response to a comparison of the viewing position parameter vector and the associated position parameter vectors;

an image synthesizer circuit, wherein the image synthesizer circuit is arranged to generate a synthesized image from the set of images;

a data generator circuit, wherein the data generator circuit is arranged to generate a reference position parameter vector for the synthesized image, wherein the reference position parameter vector is indicative of a viewing position and a viewing direction for the synthesized image;

an image encoder circuit, wherein the encoder circuit is arranged to encode the synthesized image to generate an encoded synthesized image;

an output generator circuit, wherein the output generator circuit is arranged to generate an output image signal comprising the encoded synthesized image and the reference position parameter vector for the synthesized image;

a transmitter circuit, wherein the transmitter circuit is arranged to transmit to the remote client the output image signal including the encoded synthesized image and the reference position parameter vector for the synthesized image, wherein the memory is arranged to store the associated position parameter vectors in a range tree structure, wherein the range tree structure is organized around the parameters of the associated position parameter vectors, wherein the selector circuit is arranged to select the subset in response to a search in the range tree structure by searching with the reference position parameter vector.

18. The apparatus of claim 17,
wherein at least one of the associated position parameter vectors includes a first time parameter,
wherein the viewing position parameter vector includes a second time parameter,
wherein the selection of the set of images includes a comparison of a difference between the first time parameter and the second time parameter.

19. The apparatus of claim 17,
wherein the selector circuit is arranged to predict a modified viewing position parameter vector from a plurality of received viewing position parameter vectors, and
wherein the selector circuit is arranged to select the set of images in response to the modified viewing position parameter vector.

20. The apparatus of claim 17,
wherein the memory is arranged to store a first depth data for the plurality of images,
wherein the image synthesizer circuit is arranged to generate a second depth data for the synthesized image in response to the first depth data of the set of images, and wherein the output generator circuit is arranged to include the second depth data in the output image signal.

* * * * *